US011765204B2

(12) United States Patent
Ramasamy et al.

(10) Patent No.: US 11,765,204 B2
(45) Date of Patent: Sep. 19, 2023

(54) MANAGING DATA MANAGEMENT POLICIES OF RESOURCES

(71) Applicant: HEWLETT PACKARD ENTERPRISE DEVELOPMENT LP, Houston, TX (US)

(72) Inventors: Sankar Ramasamy, Bangalore (IN); Aswin Jayaraman, Bangalore (IN); Sijesh T Balakrishnan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 589 days.

(21) Appl. No.: 16/586,282

(22) Filed: Sep. 27, 2019

(65) Prior Publication Data

US 2021/0099486 A1    Apr. 1, 2021

(51) Int. Cl.
*H04L 29/06* (2006.01)
*H04L 9/40* (2022.01)
*G06F 9/455* (2018.01)

(52) U.S. Cl.
CPC .......... *H04L 63/20* (2013.01); *G06F 9/45558* (2013.01); *G06F 9/45541* (2013.01); *G06F 2009/4557* (2013.01); *G06F 2009/45591* (2013.01)

(58) Field of Classification Search
CPC ................. G06F 9/455; G06F 9/45558; G06F 2009/45583; G06F 2009/4557; H04L 63/20; H04L 63/10
See application file for complete search history.

(56) References Cited

U.S. PATENT DOCUMENTS

| 7,856,653 | B2 | 12/2010 | Berger et al. | |
| 8,261,317 | B2* | 9/2012 | Litvin | H04L 63/0263 709/227 |
| 9,251,349 | B2 | 2/2016 | Haikney et al. | |
| 9,300,640 | B2 | 3/2016 | Pate | |
| 2007/0239979 | A1* | 10/2007 | Berger | H04L 63/102 709/225 |
| 2009/0249438 | A1* | 10/2009 | Litvin | H04L 63/0263 726/13 |
| 2013/0067472 | A1* | 3/2013 | Laverone | G06F 9/5061 718/1 |
| 2014/0173598 | A1* | 6/2014 | Haikney | G06F 9/4856 718/1 |

(Continued)

OTHER PUBLICATIONS

"VMWare, Site Recovery Manager Administration 8.1, 2018, VMware inc, pp. 48-69" (Year: 2018).*

(Continued)

*Primary Examiner* — Dao Q Ho
(74) *Attorney, Agent, or Firm* — Trop, Pruner & Hu, P.C.

(57) ABSTRACT

Examples described herein relate to a method for managing data management policies of resources. An example includes detecting a movement of a resource from a first resource group protected by a first data management policy to a second resource group protected by a second data management policy. Further, in response to detection of the movement of the resource, a data management policy of the second resource group may be upgraded if first data management policy provides an enhanced level of copy data management over the second data management policy.

20 Claims, 5 Drawing Sheets

(56) References Cited

U.S. PATENT DOCUMENTS

| | | | |
|---|---|---|---|
| 2015/0019864 A1* | 1/2015 | Pate | H04L 63/083 |
| | | | 713/168 |
| 2016/0350148 A1* | 12/2016 | Kitagawa | G06F 9/45558 |
| 2017/0109187 A1* | 4/2017 | Cropper | G06F 1/3234 |
| 2020/0142594 A1* | 5/2020 | Krishna Murthy | G06F 3/0605 |
| 2020/0174845 A1* | 6/2020 | Toeroe | G06F 9/5005 |

OTHER PUBLICATIONS

VMware, Inc., "Storage Policy Protection Groups and Periodic Polling," Oct. 8, 2015, pp. 1-2. Retrieved from the Internet on May 15, 2019 at URL: <docs.vmware.com/en/Site-Recovery-Manager/6.1/com.vmware.srm.admin.doc/GUID-CD010BED-7D54-4CBA-AB04-51F635A460F8.html>.

* cited by examiner

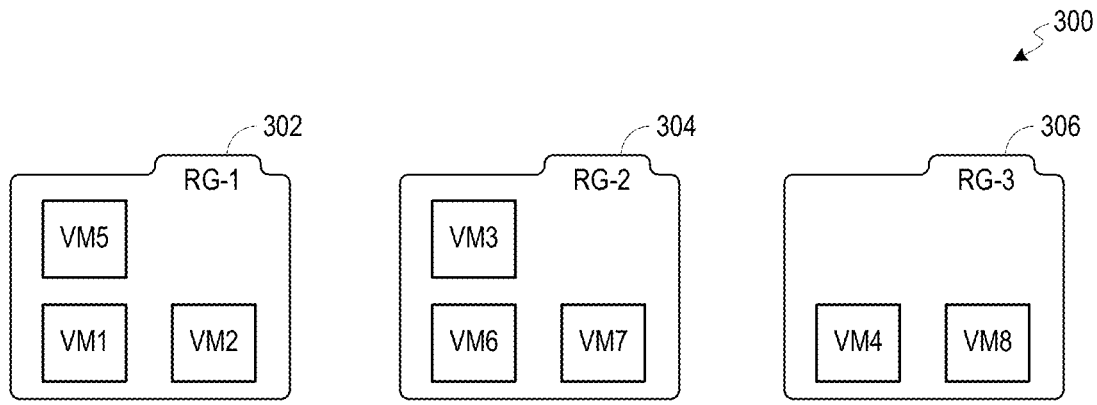
FIG. 3
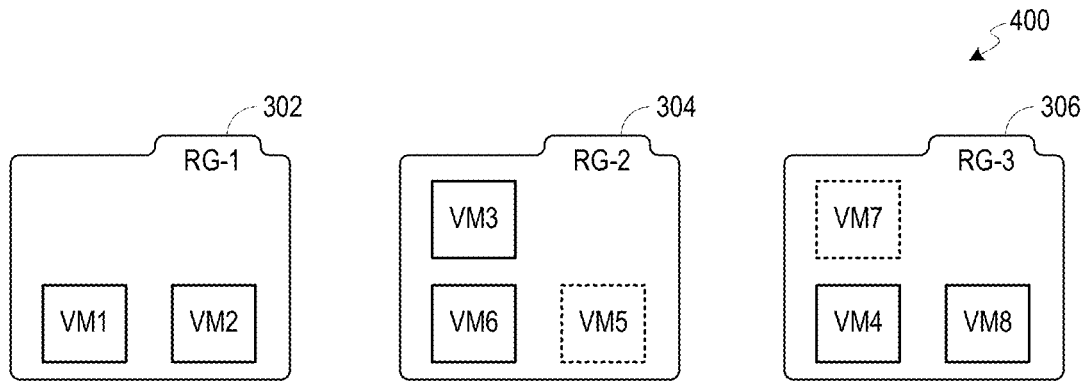
FIG. 4
| RESOURCE | RESOURCE GROUP | DATA MANAGEMENT POLICY |
|---|---|---|
| VM1 | 302 | GOLD |
| VM2 | 302 | GOLD |
| VM3 | 304 | SILVER |
| VM4 | 306 | BRONZE |
| VM5 | 302 | GOLD |
| VM6 | 304 | SILVER |
| VM7 | 304 | SILVER |
| VM8 | 306 | BRONZE |
FIG. 5
| RESOURCE | RESOURCE GROUP | DATA MANAGEMENT POLICY |
|---|---|---|
| VM1 | 302 | GOLD |
| VM2 | 302 | GOLD |
| VM3 | 304 | GOLD |
| VM4 | 306 | SILVER |
| VM5 | 304 | GOLD |
| VM6 | 304 | GOLD |
| VM7 | 306 | SILVER |
| VM8 | 306 | SILVER |
FIG. 6

MANAGING DATA MANAGEMENT POLICIES OF RESOURCES

BACKGROUND

The present disclosure relates to a method for managing data management policies of resources. The resources may include, but are not limited to, virtual machines, databases, sets of files, and the like, for example. The virtual machines, databases, and the sets of files may be hosted on one or more computing nodes. Further, such computing nodes may be connected to each other over a network. Moreover, physical storage systems for example, memory devices may also be connected to the network.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein:

FIG. 3 illustrates a grouping of resources in a plurality of resource groups, in accordance with an example;

FIG. 4 illustrates a grouping of resources in a plurality of resource groups after movement of one or more resources, in accordance with an example;

FIG. 5 depicts a lookup table corresponding to the grouping of the resources shown in FIG. 3, in accordance with an example;

FIG. 6 depicts a lookup table corresponding to the grouping of the resources shown in FIG. 4, in accordance with an example;

Figure 1:
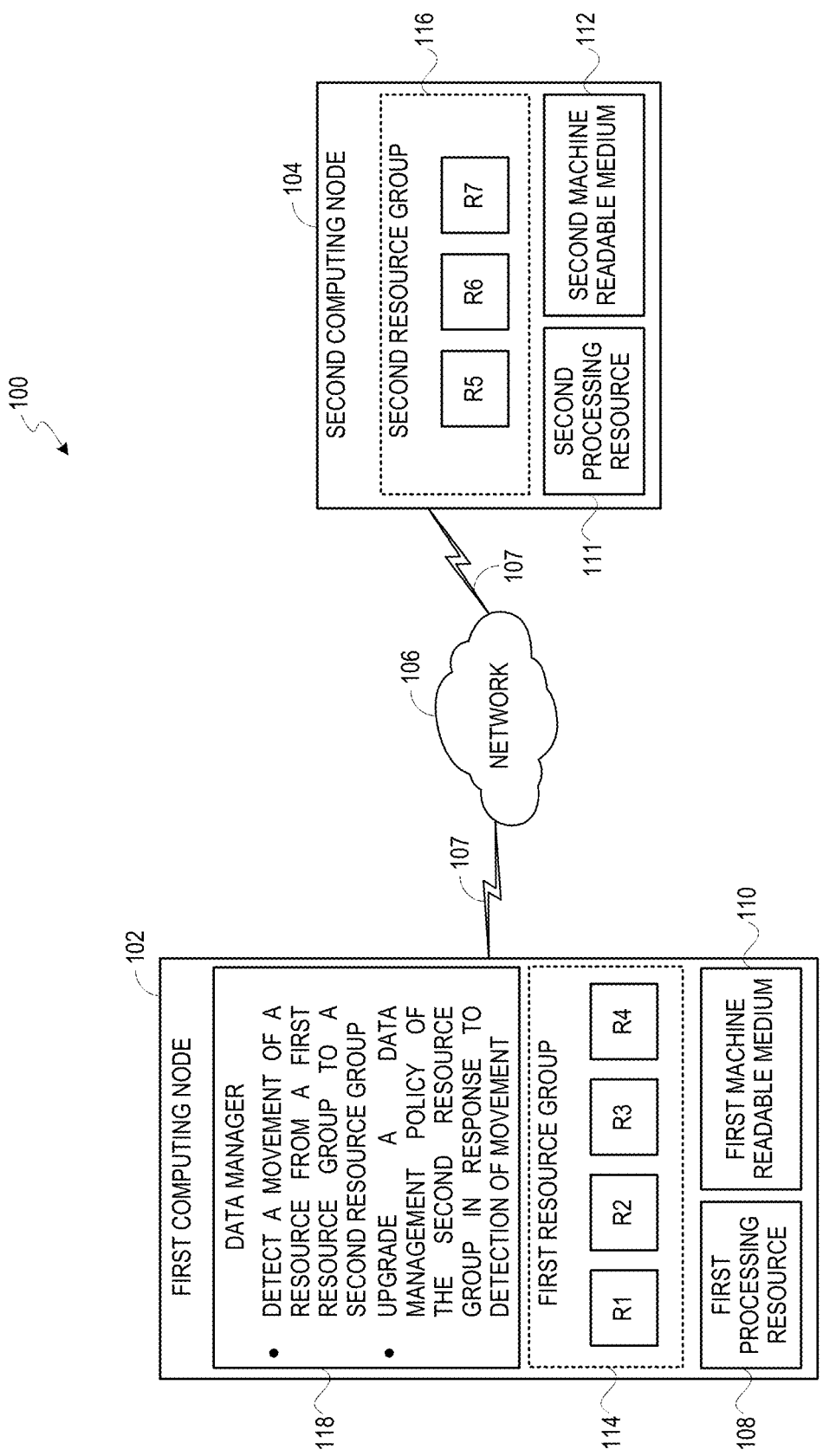
FIG. 1 illustrates a distributed computing system, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The term "resource" as used herein may include, but not limited to, virtual machines, databases, a set of files, a directory of files, and the like, for example. For ease of collective management, the resources such as the virtual machines, databases, set of files, and directory of files, are often grouped as sets of resources—generally referred to as resource groups. For instance, depending on user requirements, virtual machines that perform similar functions may be grouped together in a folder. Alternatively, virtual machines that serve one organization may be grouped in another folder, for example. Similarly, other types of resources, for example, databases, may also be arranged/cataloged in various resource groups for collective management thereof.

Due to such arrangement/cataloging of the resources in one or more resource groups, it is possible to apply certain provisions at a resource group level. For instance, one such provision may be a data management policy, for example, a copy policy, that defines a set of rules to manage one or more copies of data for resources such as virtual machines and/or databases. In particular, the data management policy may define when, what (e.g., type of copy), and how a given resource group needs to be protected by managing copies of the respective resources. For example, depending on data management service level agreements (SLAs), critically of the resource or the resource group, and/or cost implications, while some resource groups may be assigned a higher level data management policy (i.e., strong data management policy), certain other resource groups may be assigned a lower level data management policy (e.g., weak data management policy). The data management policy, once assigned to the resource group, will be applicable to all resources in the resource group.

During operation, a given resource may move in or out of that resource group or migrate to a completely different resource group. For instance, the resource may move from a resource group having a stronger data management policy to a resource group having a weaker data management policy or to a resource group having no data management policy. In some examples, a strength of the data management policy may be defined by one or more of a type of features, a number of features, or a frequency of using the features in the data management policy. By way of example, a data management policy that uses more number of features may be considered as a stronger data management policy in comparison to a data management policy having lower number of features. In some embodiments, a stronger data management policy may have higher frequency of using the features in comparison to the frequency of using features in a weaker data management policy. As will be appreciated, the stronger data management policy may provide an enhanced copy data management in comparison to a copy data management provided by a weaker data management policy. Additional details of the data management policies will be described in the description hereinafter.

For example, when a virtual machine (i.e., resource) which is a part of a folder (i.e., resource group) protected with a strong data management policy moves out of the folder group for some reason (e.g., a resource scheduler), the virtual machine may not be protected any more. Alternatively, the virtual machine may have moved to a resource group/folder which has completely different protection policy. In another case, a virtual machine can be part of a data store on day-X and is moved to a completely different data store on day-Y. Accordingly, the virtual machine could have been protected on day-X (when the virtual machine was part of a group) but may not be protected on day-Y (when the virtual machine is part of an unprotected group) or it is protected by a completely different policy. It is desirable that such movements of the resources are notified to a user/administrator as the data management SLAs for the resource would now be different or the resource could be unprotected.

In accordance with some aspects of the present disclosure, a method is provided for ensuring that the resources are protected by necessary provisions to meet the data management SLAs even in case of movement of the resources from one resource group to another. Accordingly, in some examples, a processor-based system (e.g., a data manager hosted on one computing node) detects a movement of a resource from a first resource group protected by a first data management policy to a second resource group protected by a second data management policy. Further, in response to detection of the movement of the resource, the processor-based system may upgrade a data management policy of the second resource group if the first data management policy provides enhanced level of copy data management over the second data management policy. By way of example, the data management policy of the second resource group may be upgraded to the first data management policy or to a third data management policy which is different from the first data management policy. The third data management policy may also provide stronger protection compared to the first data management policy. Moreover, in some examples, a user or an administrator may also be alerted about such movement of the resource and/or any upgrade to the data management policy of the resource.

Advantageously, due to such correction (i.e., upgrade) in the data management policies of the resource groups in the event of movement of resources across resource groups, the resource that has moved from a resource group having stronger data management policy may still be protected with stronger data management SLAs. In fact, the moved resource may be stopped from being under protected thereby maintaining the data management SLAs. Consequently, data reliability of in a distributed computing system may be enhanced and data losses may be minimized.

Referring now to drawings, FIG. 1 illustrates a distributed computing system 100, in accordance with an example. The distributed computing system 100 of FIG. 1 may include a first computing node 102 and a second computing node 104 coupled to each other via a network 106. The first computing node 102 and the second computing node 104 are coupled to the network 106 via communication links 107, as depicted in FIG. 1. The network 106 may refer to a medium that interconnects plurality of computing nodes. Examples of the network 106 include, but are not limited to, local area network (LAN), wireless LAN (WLAN), metropolitan area network (MAN), wide area network (WAN), and the Internet. Communication over the network 106 may be performed in accordance with various communication protocols such as, but not limited to, Transmission Control Protocol and Internet Protocol (TCP/IP), User Datagram Protocol (UDP), IEEE 802.11n, and cellular communication protocols. The communication links 107 may be enabled via a wired (e.g., Ethernet, optical communication, etc.) or wireless (e.g., Wi-Fi®, cellular communication, satellite communication, etc.) communication technologies.

Figure 2:
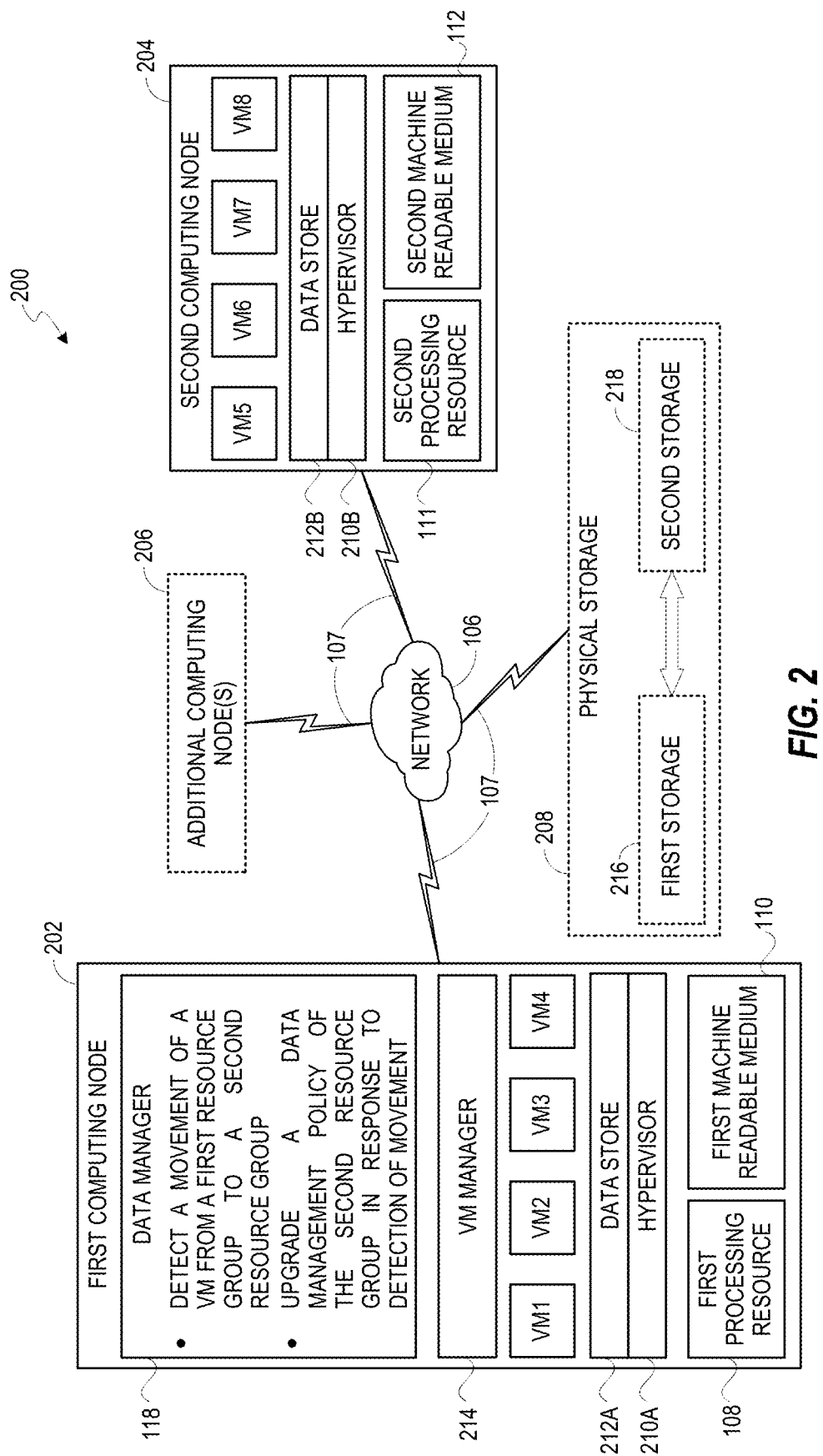
FIG. 2 illustrates a distributed computing system, in accordance with another example.

Although the present example of the distributed computing system 100 refers to two computing nodes for convenience, the various aspects described herein are also applicable to network systems that include one or more additional nodes (shown in FIG. 2 for example). Each of the first computing node 102, the second computing node 104, as well as any additional computing nodes, may be a computer, a device including a processor/microcontroller and/or any other electronic component, device or system that performs one or more operations according to one or more programming instructions. Examples of the computing nodes 102, 104 may include, but are not limited to, a desktop computer, a laptop, a smartphone, a server, a computer appliance, a workstation, a storage system, or a converged or hyperconverged system, and the like. The first computing node 102, the second computing node 104, as well as any additional computing nodes are accessible over the network 106.

Further, in some implementations, each of the first computing node 102 and the second computing node 104 may include a processing resource and a machine readable medium. For example, the first computing node 102 may include a first processing resource 108, and a first machine readable medium 110 as shown in FIG. 1. Similarly, the second computing node 104 may include a second processing resource 111 and a second machine readable medium 112. Some features of the first computing node 102 may be analogous in many respects to corresponding features of the second computing node 104. For example, the first processing resource 108, the first machine readable medium 110 of the first computing node 102 may be analogous, in terms of hardware and/or functionality, to the second processing resource 111, the second machine readable medium 112 of the second computing node 104. Features and components of the first computing node 102 will now be described, and it may be appreciated and understood that such description may also apply to analogous features and components of the second computing node 104.

Non-limiting examples of the first processing resource 108 may include a microcontroller, a microprocessor, central processing unit core(s), an application-specific integrated circuit (ASIC), a field programmable gate array (FPGA), etc. The first machine readable medium 110 may be a non-transitory storage medium, examples of which include, but are not limited to, a random access memory (RAM), a read-only memory (ROM), an electrically erasable programmable read-only memory (EEPROM), a flash memory, a hard disk drive, etc. The first processing resource 108 may execute instructions (i.e., programming or software code) stored on the first machine readable medium 110. Additionally or alternatively, the first processing resource 108 and/or the second processing resource 111 may include electronic circuitry for performing the functionality described herein.

Further, in some examples, each of the first and second computing nodes 102 and 104 may include one or more resources. For example, the first computing node 102 may include resources such as resources R1, R2, R3, and R4. Similarly, the second computing node 104 may include resources such as resources R5, R6, and R7. The resources R1, R2, R3, R4, R5, R6, and R7 are hereinafter collectively referred to as the resources R1-R7. It may be noted that while the first computing node 102 is shown to include four resources and the second computing node 104 is shown to include three resources, any number of resources may be hosted on the computing nodes 102, 104, without limiting the scope of the present disclosure. The resources R1-R7 may include a database, a file, a set of files, a directory of files, a virtual machine, a container or a containerized application, or combinations thereof. It is to be noted that present disclosure is not limited with respect to a type of the resources R1-R7. The term "database" as used herein may refer to a data structure that stores organized information. The information may be stored in the database in a tabular form, arranged in a hierarchical and/or networked relationships. For example, the database may contain various tables, which may each include several different fields. The term "virtual machine" may refer to an instance of an operating system hosted on a hypervisor (not shown) installed on a given computing node. The hypervisor may be a type-1 hypervisor or a type-2 hypervisor.

In some instances, for ease of collective management, the resources R1-R7 may be grouped as sets of resources—generally referred to as resource groups such as a first resource group 114 and a second resource group 116, as depicted in FIG. 1. The resource groups 114, 116 may be formed such that the first resource group 114 includes the resources R1-R4 and the second resource group 116 includes the resources R5-R7, for example. Further, a resource group may be a logical construct that represent a set of resources. By way of example, the resource groups 114, 116 may be folders, containers, or merely a logical grouping of the resources R1-R7. Depending on user requirements, resources performing similar functions and/or intended for similar use may be grouped together in a folder (i.e., resource group). Alternatively, the resources which serve a common organization may be grouped in another folder, for example. Further, in the example of FIG. 1, the resource groups 114, 116 include resources from the same host computing node. For example, the first resource group 114 includes the resources R1-R4 hosted on the first computing node 102 and the second resource group 116 includes the resources R5-R7 hosted on the second computing node 104. It may be noted that a resource group may include resources from other computing nodes as well (see FIG. 3), without limiting the scope of the present disclosure.

Further, the first computing node 102 may also host a data manager 118. In an example, the data manager 118 may be implemented as a virtual machine that may be hosted on the hypervisor installed on the first computing node 102. In another example, the data manager 118 may represent a program module that is executed by the first processing resource 108, where the program instructions corresponding to the data manager 118 may be stored in the first machine readable medium 110. Although, in the example of FIG. 1, the data manager 118 is shown as hosted on the first computing node 102, the data manager 118 may also be hosted on any other computing node, for example, the second computing node or any other computing node (not shown) without limiting the scope of the present disclosure.

The data manager 118 may be responsible for protecting the data of the resources R1-R7 in compliance with data management policies of corresponding resource groups 114, 116. For instance, the data manager 118 may manage data management policies corresponding to the resources R1-R7 and manage copies of the data corresponding to the resources R1-R7 as per corresponding data management policies. By way of example, the data management policy may be a copy policy. The copy policy may define certain rules to securely take copies of data stored on the computing nodes 102, 104 to an external physical storage (not shown in FIG. 1). In particular, the data management policy (e.g., the copy policy) may define when, what (e.g., type of copy), and how the copies of data corresponding to the resources R1-R7 needs to be managed. Additional details of the data manager 118 will be described in in the description hereinafter and more particularly conjunction with FIG. 2. Also, various additional details and examples of the data management policies will be descried in conjunction with FIG. 2.

Due to arrangement or cataloging of the resources R1-R7 in one or more resource groups 114, 116, it is possible to apply certain provisions such as the data management policy at the resource group level. For example, depending on certain requirements, such as, data management SLAs of the resources or the resource groups, and/or cost implications, some resource groups may be assigned a higher level data management policy (i.e., strong data management policy) and certain other resource groups may be assigned a lower level data management policy (e.g., weak data management policy). In the present instance of FIG. 1, the first resource group 114 may be assigned a first data management policy and the second resource group 116 may be assigned a second data management policy, for example. The first data management policy may be the higher level data management policy which provides stronger copy data management compared to the copy data management provided by the second data management policy which may be the lower level data management policy. The term "copy data management" as used herein may refer to managing different types of copies of the data corresponding to the resources in accordance with the data management policies. Additional details of the types of copies and the data management policies will be described in conjunction with FIG. 2. The data management policy, once assigned to the resource group, will be applicable to all resources in the respective resource group. In some examples, the data management policies may be assigned and managed via data manager 118 based on user defined rules or criteria.

During operation, a resource may move in or out of the first resource group 114 or migrate to a completely different resource group. The movement of the resource from one resource group to another resource group may be caused based on a set of predetermined rules, a user initiated action, or a combination thereof. The present disclosure is not limited with respect to parameters and/or rules that cause movement of the resources across the resource groups. For instance, the resource R4 may move from the first resource group 114 having the stronger first data management policy to the second resource group having the weaker second data management policy. After such movement of the resource R4 to the second resource group 116, if no other action is taken, the resource R4, being part of the resource group 116, might be protected as per the second data management policy which may provide the weaker copy data management for the resource R4 in comparison to the first data management policy. In some instances, if the resource R4 is protected via the second data management policy instead of the first data management policy, certain data management SLAs for the resource R4 may be violated. It is desirable that such movements of the resources are notified to a user/administrator as the data management SLAs for the resource would now be different or the resource could be unprotected.

To that end, in accordance with some aspects of the present disclosure, the data manager 118 may detect such movement of the resource(s) from one resource group to another resource group. For example, the data manager 118 may detect that the resource such as the resource R4 has moved from the first resource group 114 having a first data management policy to the second resource group having a second data management policy which is weaker compared to the first data management policy. Further details of detecting the movement of the resource by the data manager 118 will be described in conjunction with FIGS. 2 and 8-9.

Moreover, the data manager 118 may also upgrade a data management policy of the second resource group 116 in response to the detection of movement of the resource (e.g., the resource R4) from the first resource group 114 to the second resource group 116. In an example, the data manager 118 may upgrade the data management policy of the second resource group 116 by changing the data management policy of the second resource group 116 to the first data management policy so that the resource that has moved will be protected by the same data management policy as it was protected earlier. In another example, the data manager 118 may upgrade the data management policy of the second resource group 116 by changing the data management policy of the second resource group 116 to a third data management policy. In some examples, the third data management policy may be stronger compared to the first data management policy.

Advantageously, due to such correction (i.e., upgrade) in the data management policy of the resource group 116 in the event of movement of the resource R4 to the resource group 116, the resource R4 that has moved from the resource group 114 having stronger data management policy may still be protected with stronger copy data management. In fact, the moved resource R4 may avoid being under protected (by the second data management policy) thereby maintaining data management SLAs in the distributed computing system 100. Consequently, data reliability in the distributed computing system 100 may be enhanced and data losses may be minimized. Moreover, the user or administrator of the distributed computing system 100 may also be alerted about the movement and/or correction/upgrade of the data management policies.

FIG. 2 illustrates a distributed computing system 200, in accordance with another example. The distributed computing system 200 may be representative of an example of the distributed computing system 100 of FIG. 1 and includes certain features that are already described in FIG. 1. For example, the distributed computing system 200 also includes features such as the network 106, the communication links 107, the first processing resource 108, the first machine readable medium 110, the second processing resource 111, the second machine readable medium 112, and the data manager 118, certain description of which is not repeated herein. As depicted in FIG. 2, the distributed computing system 200 may include a first computing node 202 and a second computing node 204 coupled to each other via the network 106. The first computing node 202 and the second computing node 204 may be representative of an example of the first computing node 102 and the second computing node 104 of FIG. 1.

In some examples, the distributed computing system 200 may include one or more additional computing nodes such as the additional computing node(s) 206 which may be similar to either of the first computing node 202 or the second computing node 204. Moreover, in some examples, the distributed computing system 200 may also include a physical storage 208 (described later). The additional computing node(s) 206 and the physical storage 208 may also be coupled to the network via wired or wireless communication links such as the communication links 107.

Referring now to the first computing node 202, the first computing node 202 may include the first processing resource 108, the first machine readable medium 110, a hypervisor 210A, a data store 212A, one or more resources such as virtual machines VM1, VM2, VM3, and VM4, a virtual machine manager 214 (labeled as "VM MANAGER"), and the data manager 118. Similarly, the second computing node 204 may also include the second processing resource 111, the second machine readable medium 112, a hypervisor 210B, a data store 212B, one or more resources such as virtual machines VM5, VM6, VM7, and VM8.

Each of the hypervisors 210A, 210B may be a computer program, firmware, or a hardware that may facilitate hosting of multiple operating system instances on a common processing resource. Each operating system instance hosted/installed on the hypervisors 210A, 210B may be referred to as a virtual machine, such as, the virtual machines VM1-VM8. Accordingly, the hypervisor 210A, 210B may provide a host operating system for the virtual machines VM1-VM8. For example, the hypervisor 210A hosts virtual machines such as the VM1-VM4, the data manager 118, and the VM manager 214 each of which may use processing resource from the first processing resource 108 and memory space from the first machine readable medium 110. Similarly, the hypervisor 210B hosts virtual machines such as the VM5-VM8 each of which may use processing resource from the second processing resource 111 and memory space from the second machine readable medium 112. The hypervisors 210A, 210B may be type-1 hypervisor (also referred to as "bare-metal hypervisor") or type-2 (also referred to as "hosted hypervisor"). The type-1 hypervisor may be installed on the hardware (e.g., the processing resource 108, 111, the machine readable medium 110, 112) of the host computing node without any intermediate operating system. The type-2 hypervisor may be installed on top of an operating system running on the host computing node without any intermediate operating system.

Furthermore, each of the data stores 212A, 212B may represent a virtualized storage enabled by the respective hypervisors 210A, 210B and include aspects (e.g., addressing, configurations, etc.) abstracted from data stored in the physical storage 208. The data stores 212A, 212B may be presented to a user environment (e.g., to the virtual machines, an operating system, applications, processes, etc.) hosted on one or more of the computing nodes 202, 204, or 206. In some examples, the data stores 212A, 212B may also provide data services such as deduplication, compression, replication, and the like. Further, in some instances, the data stores 212A, 212B may be object-based. For example, in the data stores 212A, 212B, data may be stored in an object store as objects. User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index. In some examples, the objects in the data stores 212A, 212B may be hierarchically arranged.

The VM manager 214 may be implemented as a virtual machine hosted on the hypervisor 210A. Alternatively, the VM manager 214 may also be hosted on the hypervisor 210B. The VM manager 214 may provide a management console for managing various aspects of the virtual machines VM1-VM8 distributed across the computing nodes 202, 204, 206 participating in the distributed computing system 200. The VM manager 214 may perform various operations including, but not limited to, compute and memory provisioning and allocation for the virtual machines VM1-VM8, performance monitoring of the virtual machines VM1-VM8, workflow automation and user privilege management, management of the hypervisors 210A, 210B in the distributed computing system 200 via a management console. The VM manager 214 may also provide statistical information about usage of virtual machines VM1-VM8. Moreover, the VM manager 214 may also facilitate the ability to scale and adjust the compute, memory, and other resource management functions from a central application. In particular, the VM manager 214 may also manage performance of each virtual machine VM1-VM8 against specified benchmarks, and may optimize compute and memory allocation wherever required to provide consistent efficiency throughout the distributed computing system 200.

The physical storage 208 may be implemented using hardware, such as, hard disk drives, solid state drives, and the like. The physical storage 208 may be referenced by the virtual machines VM1-VM8, an operating system, applications, processes, etc., running on the computing nodes 202, 204, 206. In some examples, the physical storage 208 may include one or more storage systems, such as a first storage 216 and a second storage 218. Both the first storage 216 and the second storage 218 may be implemented using physical memory storages devices. For example, the first storage 216 may be implemented as a primary storage using storage arrays. Whereas the second storage 218 may be implemented as a secondary storage which may be a long term or archive storage system. The physical storage 208 may be coupled to the network via Fibre Channel (FC), Internet Small Computer Systems Interface (iSCSI), Ethernet, or like. The first storage 216 and the second storage 218 may be coupled to each other via FC or iSCSI, for example.

Further, in the example of FIG. 2, the data manager 118 may be implemented as a virtual machine running on the hypervisor such as the hypervisor 210A. Alternatively, the data manager 118 may also be hosted on the hypervisor 210B. In some examples, the data manager 118 may be hosted on the additional computing node 206. The data manager 118 may be responsible for the data management of the resources such as the virtual machines VM1-VM8 by managing copies thereof. In particular, the data manager 118 may integrate first storage 216 with the second storage 218 to provide converged data management. The data manager 118 facilitates a policy-driven copy data management for the resources such as the virtual machines VM1-VM8 at speeds required for all-flash storage.

The data manager 118 may facilitate various copy features (i.e., type of copies) based on which one or more data management policies (e.g., copy policies) may be defined. By way of example, such copy features may include, but are not limited to, a snapshot, a secondary copy, a tertiary copy, a cloud copy, etc. A snapshot may refer to a point-in-time copy of the data associated with a given resource, for example, one or more of the virtual machines VM1-VM8. By way of example, the snapshot may include information such as a data state such as powered off, powered on and suspended, corresponding to a given virtual machine. The snapshot may be stored locally on the respective computing nodes 202, 204, 206 and/or on the first storage 216 in the physical storage 208. Further, the copy feature such as the secondary copy may provide a second-tier of data protection by additionally storing the copies of snapshots on the second storage 218 in the physical storage 208. The copy stored in the second storage 218 may be block-level copies of volumes, de-duplicated to save space. The copy stored on the second storage 218 may be used to recover data back to the first storage 216 even if an original data on the computing nodes 202, 204, 206 is lost. A tertiary copy may refer to a copy of the secondary copy on a third storage (not shown) in the physical storage 208. A cloud copy may refer to copy of the secondary copy stored on a cloud storage (not shown), where the physical storage 208 may be coupled to the cloud storage via the network 106.

Data management policies may be defined using various combinations and frequencies of using the copy features such as the snapshot, the secondary copy, the tertiary copy, and the cloud copy. A Table-1 presented below may provide a list of example data management policies defined using the copy features.

TABLE 1

Example Data management policy Configurations

| Example Policy Labels | Copy features |
| --- | --- |
| Platinum | Snapshot, Secondary copy, Cloud Copy |
| Gold | Snapshot, Secondary copy, Tertiary copy |
| Silver | Snapshot, Secondary copy |
| Bronze | Snapshot |

It is to be noted that the example policies listed in Table-1 are for illustration only and should not be considered to be limiting in any respect. In Table-1, the data management policies such as the Platinum, Gold, Silver, and Bronze are listed in an order of their strength, from strongest copy data management (e.g., Platinum) to weakest copy data management (e.g., Bronze). In some examples, a strength of a data management policy may be defined by one or more of the type of copy features, a number of copy features, and or a frequency of using the copy features in the data management policy. For instance, a data management policy that uses more number of copy features may be considered as a stronger data management policy in comparison to a data management policy having lower number of copy features. In the example data management policies listed in Table-1, the Platinum policy may provide the strongest copy data management among the four policies by using copy features such as the snapshot, the secondary copy and the cloud copy. Further, the Gold policy may provide data management using copy features such as the snapshot, the secondary copy and the tertiary copy. Further, the Silver policy may provide data management using copy features such as the snapshot and the secondary copy. The Bronze policy may provide data management using the snapshot feature.

Further, in some examples, a stronger data management policy may have higher frequency of using the copy features in comparison to the frequency of using the copy features in the weaker data management policy. The term "frequency" as used herein may refer to a number of times a given copy feature is effected or used per unit time. For example, in the Platinum policy, 15 snapshots, 10 secondary copies, and 5 cloud copies may be effected in an hour. In comparison to the Platinum policy, in the Gold policy, 10 snapshots, 5 secondary copies, and 2 tertiary copies may be effected in an hour, for example. In some examples, the frequencies of the copy features in the copy policies may be customizable. The data manager 118 may present a user interface to define new policies to customize the data management policies.

As noted hereinabove, for collective management of the resources, the resources may be arranged or cataloged into a plurality of resource groups. In the example configuration of FIG. 2, the resources such as the virtual machines VM1-VM8 may be classified into a plurality of resource as well. One such example, cataloging of the virtual machines VM1-VM8 is depicted in FIG. 3. Referring now to FIG. 3, a grouping 300 of resources, such as the virtual machines VM1-VM8, in a plurality of resource groups 302, 304, 306 is presented, in accordance with an example. The resource groups 302, 304, 306 (hereinafter collectively referred to as resource groups 302-306) are marked as RG-1, RG-2, and RG3, respectively, in FIG. 3. For ease of illustration, the resources, for example, the virtual machines VM1-VM8, are grouped in three resource groups 302-306. It is understood that depending on user requirements, type of resources, application specific requirements, protection SLAs, or combinations thereof, the virtual machines VM1-VM8 may be categorized into less than three or more than three resource groups, without limiting the scope of the present disclosure.

In another example, as depicted in FIG. 3, the resource group 302 includes virtual machines VM1, VM2, and VM5; the resource group 304 includes virtual machines VM3, VM6, and VM7; and the resource group 306 includes virtual machines VM4 and VM8. The grouping of the virtual machines VM1-VM8 may be performed using a suitable virtual machine management application, for example, the VM manager 214, without limiting scope of the present disclosure. Further, it may be noted that a resource group may contain resources from a single computing node (see FIG. 1) or resources from multiple computing nodes as shown in FIG. 3. Each resource group 302-306 may include resources that may serve requirements of a given application. By way of example, the resource group 302 may include resources, for example, the virtual machines VM1, VM2, and VM5 which may serve requests from a legal group of a company. Further, the resource group 304 may include resources, for example, the virtual machines VM3, VM6, and VM7 which may serve requests from a finance group of the company, for example. Moreover, the resource group 306 may include resources, for example, the virtual machines VM4 and VM8 which may serve requests from a manufacturing unit of the company, for example. Further, depending the data management SLAs, the resource groups 302-304 may be protected with appropriated data management policies. For example, the resource groups 302, 304, 306 may be protected by the Gold policy, the Silver policy, and the Bronze policy, respectively, described hereinabove.

The data manager 118 may create a lookup table (see FIG. 5) that stores a relationship between a plurality of resources, a resource group corresponding to each of the plurality of resources, and a data management policy corresponding to each of the plurality of resource groups. Referring now to FIG. 5, a lookup table 500 corresponding to the grouping 300 of the resources shown in FIG. 3 is depicted, in accordance with an example. The lookup table 500 represents the plurality of resources VM1-VM8, the resource group 302-306 corresponding to each of the plurality of resources VM1-VM8, and the data management policy corresponding to each of the plurality of resource groups 302-306 in accordance with the grouping of the resources depicted in FIG. 3. For example, the lookup table 500 includes three columns labeled as "RESOURCE," "RESOURCE GROUP," and "DATA MANAGEMENT POLICY," respectively. The first column—"RESOURCE" lists all available resourced in the distributed computing system 200, for example. The second column—"RESOURCE GROUP" lists a resource group corresponding to each of the resources listed in the first column. Further, the third column—"DATA MANAGEMENT POLICY" lists a copy policy, for example, corresponding to each of the resource groups listed in the second column.

Referring back to FIG. 2, during operation, a given resource may move in or out of that resource group or migrate to a completely different resource group. For instance, the resource may move from a resource group (e.g., the resource group 302) having a stronger data management policy to a resource group (e.g., the resource group 302 or 304) having a weaker data management policy. For example, FIG. 4 illustrates a grouping 400 of resources in the plurality of resource groups 302, 304, 306 after movement of one or more resources, in accordance with an example. For instance, the virtual machine VM5 (which is marked with a dotted box) may have moved from the resource group 302 protected by the Gold policy to the resource group 304 protected by the Silver policy. Similarly, the virtual machine VM7 (which is marked with a dotted box) may have moved from the resource group 304 protected by the Silver policy to the resource group 306 protected by the Bronze policy.

Based on the movement of the one or more virtual machines (e.g., the VM5, VM7) from one resource group to another, the data manager 118 may also update the lookup table 500 to reflect the updated resource groups for the moved resources. FIG. 6 depicts one such updated lookup table. Referring now to FIG. 6, a lookup table 600 corresponding to the grouping 400 of the resources shown in FIG. 4 is depicted, in accordance with an example. The lookup table 600 may represent updated lookup table 500 after the movement of the resources VM5 and VM7. In particular, the lookup table 600 represents the plurality of resources VM1-VM8, the resource group 302-306 corresponding to each of the plurality of resources VM1-VM8, and the data management policy corresponding to each of the plurality of resource groups 302-306 after the movement of any VM has happened. Based on the movement of the virtual machines VM5 and VM7 as depicted in FIG. 4, a second column—"RESOURCE GROUP" of lookup table 600 now includes updated entry indicating a current resource group.

In some examples, the data manager 118 may detect the movement of a virtual machine (VM5, VM7) from one resource group to another resource group. In order to detect such movement of the resource, the data manager 118 may continuously monitor the virtual machines VM1-VM8 and update the lookup tables 600. Based on any change in the resource group for any virtual machine, the data manager 118 may determine that the resource has moved from one resource group to another. Additional details of detecting the movement of the virtual machines by the data manager 118 will be described in conjunction with a method described in FIG. 9.

Further, in response to detection of movement of the resource from one resource group to another (e.g., movement of VM5 from the resource group 302 to the resource group 304), the data manager 118 may upgrade a data management policy of the resource group 304. In particular, in an example, the data management policy of the resource group 304 may be upgraded to the first data management policy (e.g., the Gold policy) that is stronger compared to the second data management policy (e.g., the Silver policy). Alternatively, in another example, the data management policy of the second resource group may be upgraded to a third data management policy (e.g., the Platinum policy) that is also stronger compared to the second data management policy. In some instances, the third data management policy such as the Platinum policy may even be stronger compared to the first data management policy. The data manager 118 may also upgrade the data management policy of the resource group 306 due to the movement of the virtual machine VM7 therein.

In accordance with some examples, once the data management policies are upgraded, the data manager 118 my further update the lookup table 600 (see FIG. 6) to reflect the upgraded data management policies for the moved virtual machines VM5, VM7. In particular, the third column—"DATA MANAGEMENT POLICY" in the lookup table 600 shows upgraded policies for the resource groups which now contains resources moved from the resource groups having stronger data management policy. For example, due to the movement of the virtual machine VM5 from the resource group 302 to the resource group 304, the data management policy of the resource group 304 has been upgraded to the Gold policy, for example. Similarly, due to the movement of the virtual machine VM7 from the resource group 304 to the resource group 306, the data management policy of the resource group 306 has been upgraded to the Silver policy, for example. Additional details of the operations performed by the data manager 118 will be described in conjunction with FIG. 9.

Figure 7:
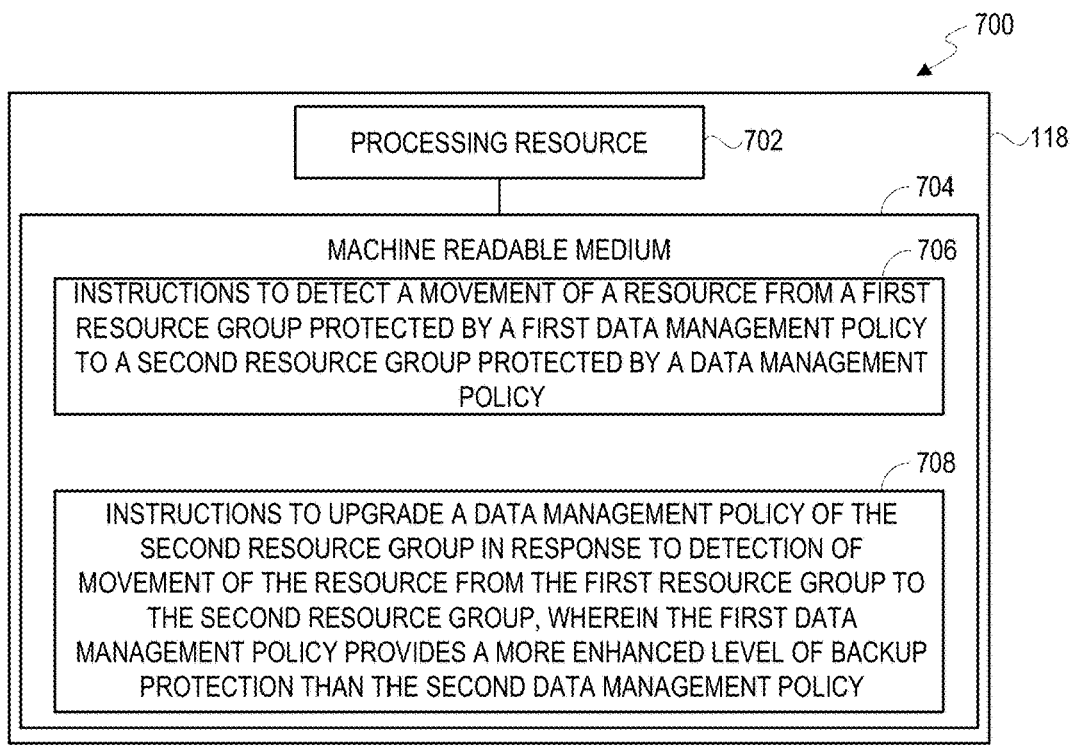
FIG. 7 is a block diagram of a data manager including a processing resource and a machine readable medium encoded with example instructions to manage data management policy of resource groups, in accordance with an example.

Turning now to FIG. 7, a block diagram 700 of the data manager 118 including a processing resource 702 and a machine readable medium 704 encoded with example instructions to manage data management policies of resource groups is presented, in accordance with an example. As previously noted, the data manager 118 may be a virtual machine hosted on respective computing nodes. Accordingly, the processing resource 702 may be representative of the first processing resource 108 or at least a portion of the first processing resource 108 (described earlier). Similarly, the machine readable medium 704 may be representative of the first machine readable medium 110 or at least a portion of the first machine readable medium 110 (described earlier). The machine readable medium 704 may be encoded with example instructions 706 and 708. The instructions 706, 708 of FIG. 7, when executed by the processing resource 702, may implement aspects of managing data management policies of resource groups, for example. In particular, the instructions 706, 708 of FIG. 7 may be useful for performing the functionality of the data manager 118 of FIGS. 1-2 and the methods described in FIGS. 8-9.

The instructions 706, when executed, may cause the processing resource 302 to detect a movement of a resource (e.g., the VM5) from a first resource group (e.g., RG1, 302) protected by a first data management policy (e.g., Gold policy) to a second resource group (e.g., RG2, 304) protected by a second data management policy (e.g., Silver policy). In particular, the instructions 706 may include instructions to execute at least a part of blocks 804, 905 of the methods described in FIGS. 8-9 (described later), respectively. Further, the instructions 708, when executed, may cause the processing resource 702 to upgrade a data management policy of the second resource group in response to detection of movement of the resource from the first resource group to the second resource group, wherein the first data management policy provides a more enhanced level of copy data management over the second data management policy. In particular, the instructions 308 may include various instructions to execute at least a part of blocks 806, 913 of the methods described in FIGS. 8-9 (described later), respectively. Moreover, although not shown in FIG. 7, the machine readable medium may also include additional program instructions to perform various other method blocks described in FIGS. 8-9.

Figure 8:
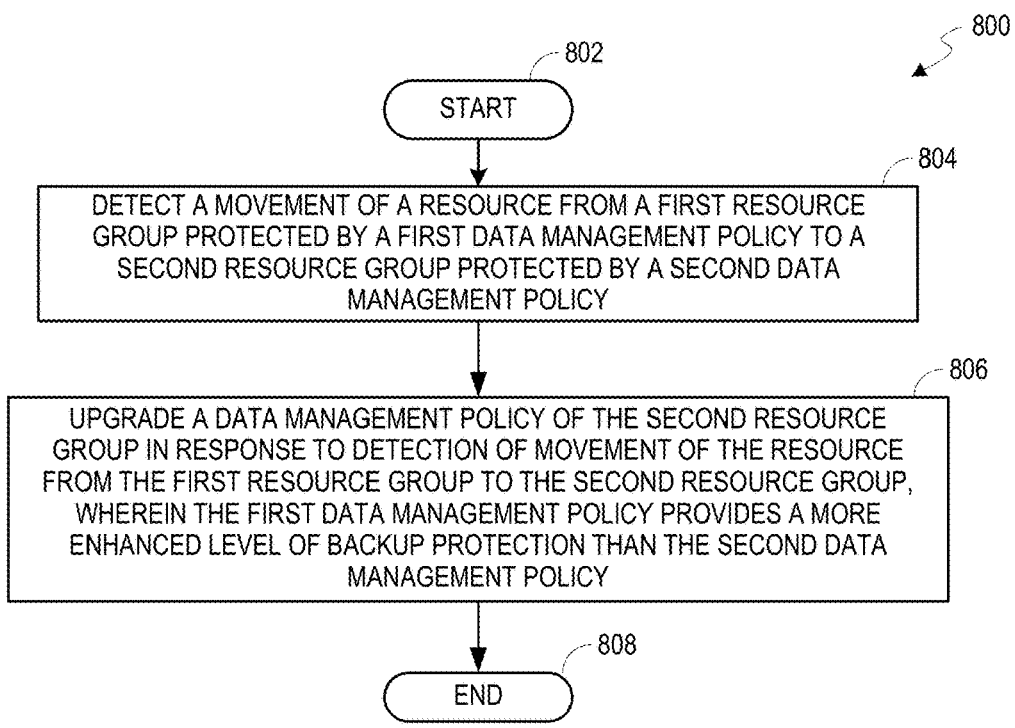
FIG. 8 is a flow diagram depicting a method to manage a data management policy of a resource group, in accordance with an example.

Moving to FIG. 8, a flow diagram depicting a method 800 to manage data management policies of resource groups is presented, in accordance with an example. For ease of illustration, the method is described with reference to FIGS. 1-6. The method 800 starts at block 802 and moves to block 804. At block 804, the method 800 includes detecting, by a processor-based system such as the data manager 118, a movement of a resource (e.g., R1-R6, VM1-VM8) from a first resource group 114, 302 protected by a first data management policy to a second resource group 116, 304 protected by a second data management policy. Details of processing involved for detecting the movement of the resource will be described in conjunction with FIG. 9. Further, at block 806, the method includes upgrading, by the processor-based system, a data management policy of the second resource group (116, 304) in response to detection of movement of the resource from the first resource group (114, 302) to the second resource group. In particular, in an example, the data management policy of the second resource group may be upgraded to the first data management policy that is stronger compared to the second data management policy. Alternatively, in another example, the data management policy of the second resource group may be upgraded to a third data management policy that is also stronger compared to the first data management policy. In some instances, the third data management policy (e.g., a Platinum policy) may be stronger compared to the first data management policy. Additional details of the block 806 will be described in conjunction with the method described in FIG. 9. The method 800 ends at block 808.

Figure 9:
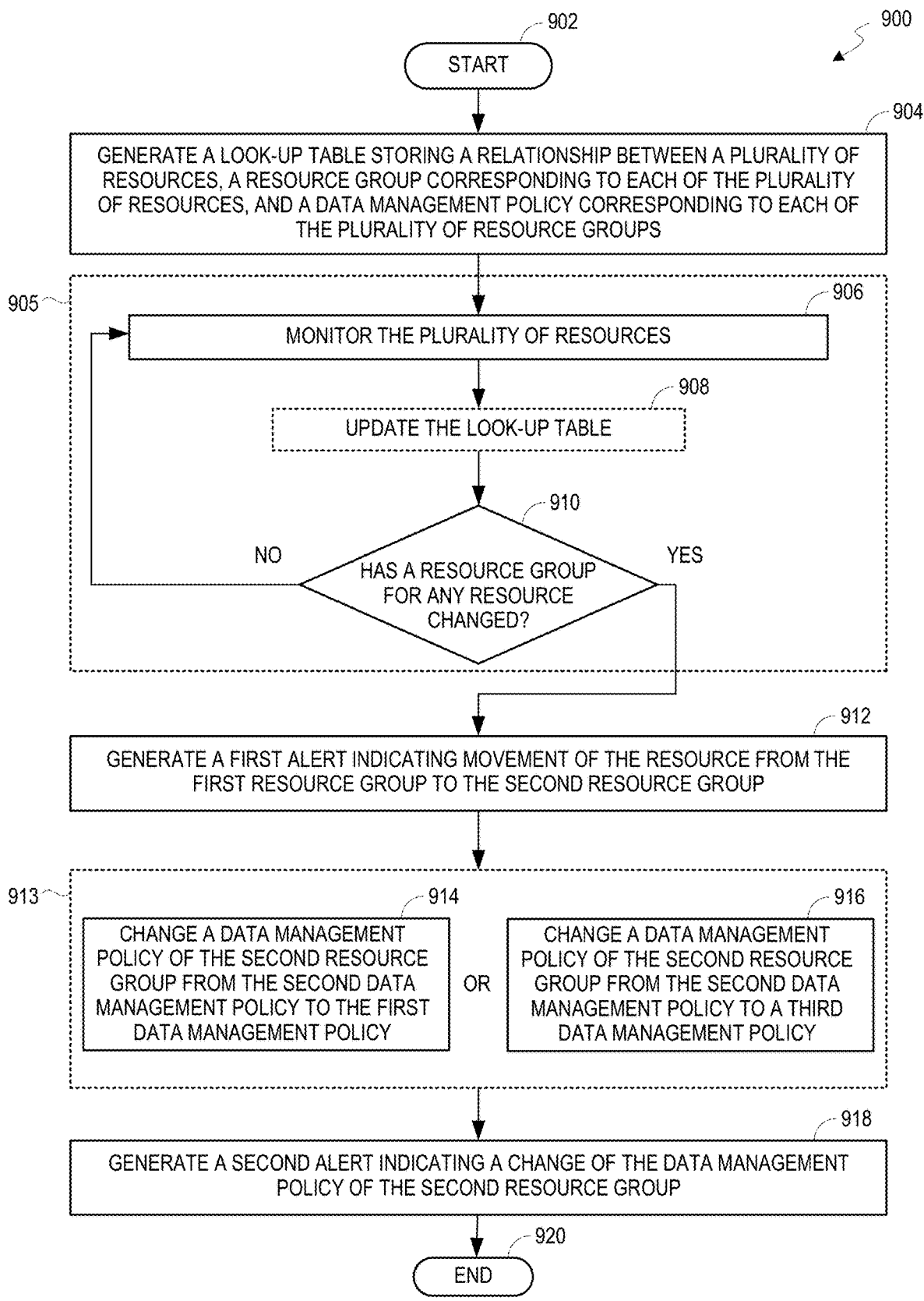
FIG. 9 is a flow diagram depicting a method to manage a data management policy of a resource group, in accordance with another example.

FIG. 9 is a flow diagram depicting a method 900 to manage data management policies of a resource group, in accordance with another example. The method 900 of FIG. 9 may represent an example of the method 800 described in FIG. 8. The method 900 is described in conjunction with the distributed computing system 200 of FIG. 2 and examples of resource groups and lookup tables illustrated FIGS. 3-6, for ease of explanation. It is to be noted that method 900 is also applicable to the distributed computing system 100 of FIG. 1, without limiting scope of the present disclosure.

The method 900 starts at block 902 and moves to block 904. At block 904, the method 900 includes generating a lookup table storing a relationship between a plurality of resources, a resource group corresponding to each of the plurality of resources, and a data management policy corresponding to each of the plurality of resource groups. By way of example, the lookup table such as the lookup table 500 may be created by the data manager 118 based on the grouping of the resources such as the virtual machines VM1-VM8. In some examples, to obtain the information such as operating status, resource groups, and/or protection/data management policies corresponding to the virtual machines VM1-VM8, the data manager 118 may send status update requests to the VM manager 214. By way of example, the data manager 118 may make API (application program interface) calls to the VM manager 214. In response to the status update requests, the VM manager 214 may send the requested information to the data manager 118. The data manager 118 may create the lookup table 500 based on the information received from the VM manager 214. The lookup table 500 may be stored in a memory (e.g., the machine readable medium 704) associated with the data manager 118.

Further, at block 905, the method 900 includes detecting, by the data manager 118, a movement of the resource (e.g., any of the virtual machines VM1-VM8) from the first resource group 302 protected by the first data management policy to the second resource group 304 protected by the second data management policy. In some examples, the method of detecting the movement of resources may include sub-blocks 906, 908, and 910. In particular, the method 900 at sub-block 906 may include monitoring the plurality of resources. In some examples, to monitor the resources such as the virtual machines VM1-VM8, the data manager 118 may, periodically or randomly, send the status update requests to the VM manager 214. In response to the status update requests, the data manager 118 may receive desired information such as the operating status, resource groups, and/or protection/data management policies corresponding to the virtual machines VM1-VM8 from the VM manager 214. Furthermore, based on the received information from the VM manager 214, the data manager 118 may update the lookup table 500, as indicated by sub-block 908. For example such updated lookup table is shown in FIG. 6 as lookup table 600.

Moreover, a check may be performed at sub-block 910 to determine whether a resource group to which a resource belongs has changed. For instance, the data manager 118 may perform the check using the lookup tables 500 and 600. At sub-block 910, the data manager 118 may compare the updated lookup table 600 with the lookup table 500 to determine any change in the resource group corresponding to each resource (e.g., virtual machine). For example, by comparing the lookup tables 500 and 600, it is observed that the resource group corresponding to the virtual machine VM5 is changed from resource group 302 (RG-1) to 304 (RG-2) indicating the movement of the virtual machine VM5 to the resource group 304 (RG-2). Similarly, the resource group corresponding to the virtual machine VM7 is changed from resource group 304 (RG-2) to 306 (RG-3) indicating the movement of the virtual machine VM5 to the resource group 306 (RG-3).

If it is determined, at step 910, that the resource groups corresponding to the resources remain unchanged, the data manager 118 may continue monitoring the resources at block 906. However, if it is determined, at block 910, that the resource group corresponding to any resource has changed, the data manager 118, at step 912 may optionally generate a first alert indicating the movement of the resource from the first resource group to the second resource group. By way of example, the first alert may be generated by the data manager 118 which may be displayed on a user interface provided to an administrator indicating that the virtual machine VM5 has moved from the resource group 302 to 304 and/or the virtual machine VM7 has moved from the resource group 304 to 306. In some examples, if the movement of the resource is critical, the first alert may also be communicated to a personal communication device, for example, a phone of the administrator via a voice message or a text message.

Further, at block 913, the method 900 includes upgrading the data management policy of the second resource group (116, 304) in response to detection of movement of the resource from the first resource group (114, 302) to the second resource group. In particular, in the example presented herein, operations at block 913 may be accomplished by performing either of the sub-blocks 914 or 916.

At block 914, a data management policy of the second resource group (i.e., a resource group to which the resource has moved-in from another resource group) may be changed to the first data management policy (i.e., the data management policy of the resource group previously containing the resource). For instance, as shown in the lookup table 600 and FIG. 4, the virtual machine VM5 has moved from the resource group 302 having the Gold policy to the resource group 304. As shown in the lookup table 500, the resource group 304 was protected by the Silver policy prior to the movement of the virtual machine VM5 therein. In accordance with some aspects of the present disclosure, the data management policy of the resource group 304 is changed to the data management policy of the resource group 302 from which the virtual machine VM5 has moved-out. In particular, the data management policy of the resource group 304 is changed to the Gold policy, at block 914.

Similarly, in another example, as shown in the lookup table 600 and FIG. 4, the virtual machine VM7 has moved from the resource group 304 having the Silver policy to the resource group 306. As shown in the lookup table 500, the resource group 306 was protected by the Bronze policy prior to the movement of the virtual machine VM7 therein. In accordance with some aspects of the present disclosure, the data management policy of the resource group 306 is changed to the data management policy of the resource group 304 from which the virtual machine VM7 has moved-out. In particular, the data management policy of the resource group 306 is changed to the Silver policy, at block 914.

Alternatively, the block 913 may include sub-block 916. The method 900 at block 916 may include changing the data management policy of the second resource group from the second data management policy to a third data management policy different from the first data management policy. For instance, the data management policy of the resource group 304 may be changed to the third data management policy, for example, the Platinum policy. As noted previously, the Platinum policy may provide stronger copy data management compared to the copy data management provided by the Silver policy or the Gold policy.

Additionally, in some examples, the method 900 may, include generating a second alert indicating a change of the data management policy of the second resource group. By way of example, the second alert may be generated by the data manager 118 to indicate the changed data management policies of the resource group 304 and/or 306. In some examples, the second alert may also be communicated to the personal communication device of the administrator, for example, via a voice message or a text message.

Various features as illustrated in the examples described herein may be implemented in various distributed computing/storage systems. Advantageously, due to correction (i.e., upgrade) in the data management policy of the resource group (116, 304, 306) in the event of movement of the resources R4, VM5, VM7 therein, the resources R4, VM5, VM7 may still be protected with stronger copy data management compared to the copy data management provided by target resource group. In fact, the moved resources R4, VM5, VM7 may avoid being under protected, thereby maintaining data management SLAs in the distributed computing system 100, 200. Consequently, data reliability of in a distributed computing system 100, 200 may be enhanced and data losses may be minimized. Moreover, the user or administrator of the distributed computing system 100, 200 may also be alerted about the movement and/or correction/upgrade of the data management policies.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   detecting, by a processor-based system, a movement of a first virtual machine from a first resource group protected by a first data management policy to a second resource group protected by a second data management policy, wherein the first data management policy comprises a first schedule for copying data of each virtual machine in the first resource group, and wherein the second resource group comprises a plurality of virtual machines; and
   upgrading, by the processor-based system, a data management policy for all of the plurality of virtual machines of the second resource group in response to detection of movement of the first virtual machine from the first resource group to the second resource group, wherein the upgraded data management policy of the second resource group comprises a second schedule for copying data of each virtual machine in the second resource group.

2. The method of claim 1, wherein the upgraded second data management policy of the second resource group specifies at least one type of copy for the data of each virtual machine in the second resource group.

3. The method of claim 1, wherein the movement of the first virtual machine from the first resource group to the second resource group is caused based on a set of predetermined rules, a user initiated action, or a combination thereof.

4. The method of claim 1, further comprising:
   monitoring, by the processor-based system, a plurality of resources, wherein the plurality of resources is categorized into a plurality of resource groups that includes the first resource group and the second resource group; and
   generating, by the processor-based system, a lookup table storing a relationship between the plurality of resources, a resource group corresponding to each of the plurality of resources, and a data management policy corresponding to each of the plurality of resource groups.

5. The method of claim 4, further comprising updating, by the processor-based system, the lookup table based on the monitoring.

6. The method of claim 4, wherein detecting the movement of the first virtual machine comprises determining, using the lookup table, that a resource group corresponding to the first virtual machine has been changed from the first resource group to the second resource group.

7. The method of claim 1, wherein upgrading the data management policy of the second resource group comprises changing the data management policy of the second resource group from the second data management policy to the first data management policy.

8. The method of claim 1, wherein upgrading the data management policy of the second resource group comprises changing the data management policy of the second resource group from the second data management policy to a third data management policy different from the first data management policy.

9. The method of claim 1, further comprising generating a first alert indicating the movement of the first virtual machine from the first resource group to the second resource group.

10. The method of claim 1, further comprising generating a second alert indicating a change of the data management policy of the second resource group.

11. A system comprising:
    computing nodes hosting a plurality of virtual machines, wherein the plurality of virtual machines is categorized into a plurality of resource groups comprising a first resource group and a second resource group; and
    a data manager hosted on a computing node of the computing nodes, wherein the data manager performs copy data management for the first resource group as per a first data management policy and for the second resource group as per a second data management policy, wherein the first data management policy comprises a first schedule for copying data of each virtual machine in the first resource group, and wherein the data manager is to:
    detect a movement of a first virtual machine of the plurality of virtual machines from the first resource group to the second resource group; and
    upgrade a data management policy for all virtual machines of the second resource group in response to detection of movement of the first virtual machine from the first resource group to the second resource group, wherein the upgraded data management policy of the second resource group comprises a second schedule for copying data of each virtual machine in the second resource group.

12. The system of claim 11, wherein the first data management policy and the second data management policy are copy policies providing different levels of protection features.

13. The system of claim 11, wherein the data manager monitors the plurality of virtual machines and generates a lookup table storing a relationship between the plurality of virtual machines, a resource group corresponding to each of the plurality of virtual machines, and the data management policy corresponding to each of the plurality of virtual machines.

14. The system of claim 13, wherein the data manager sends status update requests to a virtual machine manager to monitor the plurality of virtual machines, wherein the virtual machine manager manages movement of the plurality of virtual machines as per a set of predetermined rules.

15. The system of claim 13, wherein the data manager determines that a resource group corresponding to the first virtual machine has been changed from the first resource group to the second resource group using the lookup table.

16. The system of claim 11, wherein the data manager upgrades the data management policy of the second resource group to the first data management policy.

17. The system of claim 11, wherein the data manager upgrades the data management policy of the second resource group to a third data management policy different from the first data management policy.

18. A non-transitory machine readable medium storing instructions executable by a processing resource, the instructions comprising:

instructions to detect a movement of a first virtual machine from a first resource group protected by a first data management policy to a second resource group protected by a second data management policy, wherein the first data management policy comprises a first schedule for copying data of each virtual machine in the first resource group, and wherein the second resource group comprises a plurality of virtual machines; and instructions to upgrade a data management policy for all virtual machines of the second resource group in response to detection of movement of the first virtual machine from the first resource group to the second resource group, wherein the upgraded data management policy of the second resource group comprises a second schedule for copying data of each virtual machine in the second resource group.

19. The non-transitory machine readable medium of claim 18, wherein the instructions to upgrade the data management policy of the second resource group comprises instruction to change the data management policy of the second resource group from the second data management policy to the first data management policy or to a third data management policy different from the first data management policy.

20. The non-transitory machine readable medium of claim 18, further comprising instructions to generate a first alert indicating the movement of the first virtual machine from the first resource group to the second resource group, instructions to generate a second alert indicating a change of the data management policy of the second resource group, or a combination thereof.

* * * * *